United States Patent
Benfield et al.

(10) Patent No.: US 7,353,387 B2
(45) Date of Patent: Apr. 1, 2008

(54) METHOD AND SYSTEM FOR INTEGRATING ENCRYPTION FUNCTIONALITY INTO A DATABASE SYSTEM

(75) Inventors: Bruce Benfield, Austin, TX (US); Constance Jane Nelin, Monte Sereno, CA (US); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1276 days.

(21) Appl. No.: 09/734,403

(22) Filed: Mar. 8, 2001

(65) Prior Publication Data

US 2002/0129260 A1 Sep. 12, 2002

(51) Int. Cl.
- *H04L 9/00* (2006.01)
- *G06F 12/14* (2006.01)
- *G06F 17/30* (2006.01)
- *G06F 12/00* (2006.01)

(52) U.S. Cl. ............... 713/165; 713/190; 726/2; 726/26; 711/151; 711/152; 711/164; 705/51; 707/9

(58) Field of Classification Search ............ 707/2, 707/9; 713/165
See application file for complete search history.

(56) References Cited

U.S. PATENT DOCUMENTS

| | | | |
|---|---|---|---|
| 4,993,069 A * | 2/1991 | Matyas et al. | 380/280 |
| 5,003,597 A | 3/1991 | Merkle | |
| 5,056,142 A | 10/1991 | Lapointe et al. | |
| 5,301,231 A * | 4/1994 | Abraham et al. | 713/191 |
| 5,425,102 A * | 6/1995 | Moy | 713/183 |
| 5,713,018 A * | 1/1998 | Chan | 707/10 |
| 5,963,947 A * | 10/1999 | Ford et al. | 707/10 |
| 5,966,707 A * | 10/1999 | Van Huben et al. | 707/10 |
| 5,978,482 A | 11/1999 | Dwork et al. | |
| 6,002,769 A | 12/1999 | McGough | |
| 6,038,317 A | 3/2000 | Magliveras et al. | |
| 6,178,243 B1 * | 1/2001 | Pomerantz et al. | 380/243 |
| 6,185,681 B1 * | 2/2001 | Zizzi | 713/165 |
| 6,275,939 B1 * | 8/2001 | Garrison | 713/200 |
| 6,360,322 B1 * | 3/2002 | Grawrock | 713/176 |
| 6,389,535 B1 * | 5/2002 | Thomlinson et al. | 713/165 |
| 6,421,703 B1 * | 7/2002 | Steinmetz et al. | 718/102 |
| 6,442,559 B1 * | 8/2002 | Martinsen et al. | 707/102 |
| 6,446,115 B2 * | 9/2002 | Powers | 709/206 |

(Continued)

FOREIGN PATENT DOCUMENTS

WO    WO0113572    * 2/2001

OTHER PUBLICATIONS

Encrytion Modes for a Translate Control Vector Instruction, Jun. 1, 1994, IBM Technical Disclosure Bulletin, vol. 37, pp. 605-606.*

(Continued)

*Primary Examiner*—Gilberto Barron
*Assistant Examiner*—Aravind K Moorthy
(74) *Attorney, Agent, or Firm*—Sawyer Law Group LLP

(57) ABSTRACT

Aspects for integrating encryption functionality into a database system are described. The aspects include providing at least two functions to support data encryption in a database system. The at least two functions are utilized within structured query language statements to preserve confidentiality of user-specified data in the database system.

28 Claims, 1 Drawing Sheet

U.S. PATENT DOCUMENTS

| | | | |
|---|---|---|---|
| 6,463,418 B1 * | 10/2002 | Todd | 705/26 |
| 6,502,102 B1 * | 12/2002 | Haswell et al. | 707/102 |
| 6,618,806 B1 * | 9/2003 | Brown et al. | 713/186 |
| 6,633,875 B2 * | 10/2003 | Brady | 707/10 |
| 6,711,575 B1 * | 3/2004 | Applewhite et al. | 707/100 |
| 6,785,810 B1 * | 8/2004 | Lirov et al. | 713/165 |
| 6,874,001 B2 * | 3/2005 | Narang et al. | 707/203 |
| 7,093,137 B1 * | 8/2006 | Sato et al. | 713/193 |
| 2006/0053112 A1 * | 3/2006 | Chitkara et al. | 707/9 |

OTHER PUBLICATIONS

IBM Technical Disclosure Bulletin, "Flexible Interface for Adding/Changing Imbedded Cryptographic Support", vol. 41, No. 01, Jan. 1998.

* cited by examiner

METHOD AND SYSTEM FOR INTEGRATING ENCRYPTION FUNCTIONALITY INTO A DATABASE SYSTEM

FIELD OF THE INVENTION

The present invention relates to database systems, and more particularly to confidential data encryption in database systems.

BACKGROUND OF THE INVENTION

Just as computers have become more and more prevalent in everyday life, networks of linked computers have become important in distributing information amongst computer users. Many computer systems are organized according to a client/server metaphor. Generally, in client/server computing, end users are each provided with a desktop computer or terminal known as a "client." The clients are connected using a network to another computer known as a "server", because its general function is to serve or fulfill requests submitted by clients. Application programs running on the clients prepare requests and transmit them to the server over the network. A 'network' of computers can be any number of computers that are able to exchange information with one another. The computers may be arranged in any configuration and may be located in the same room or in different countries, so long as there is some way to connect them together (for example, by telephone lines or other communication systems) so they can exchange information. Just as computers may be connected together to make up a network, networks may also be connected together through tools known as bridges and gateways. These tools allow a computer in one network to exchange information with a computer in another network.

Of particular interest in today's computing environment are relational database applications. Relational DataBase Management System (RDBMS) software using a Structured Query Language (SQL) interface is well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies in its ability to link information from multiple tables or views together to perform complex sets of procedures with a single statement.

The power of being able to gather, store, and relate information in database systems and then operate on that information through SQL allows for an almost limitless range of applications for such technology. Together with computer networks, including the Internet, incredible opportunities exist for people and businesses to communicate and to conduct commerce. Concerns arise with these opportunities, particularly with regard to ensuring confidentiality of personal information, sensitive communications, and financial data.

For example, users sometimes are required to input personal information, such as credit card information, for processing within a website. While security techniques may be used during the transmission of the data, within the database receiving and storing the information, the information remains accessible to the database administrator (DBA). A DBA refers to an individual who is responsible for the design, development, operation, safeguarding, maintenance, and use of a database. Unfortunately, the accessibility of the confidential, personal information of a user creates an opportunity for intruders/malicious DBAs to misuse the information.

Accordingly, a need exists for a technique that provides users with a straightforward and flexible manner of protecting confidential information within a database. The present invention addresses such a need.

SUMMARY OF THE INVENTION

The present invention provides aspects for integrating encryption functionality into a database system. The aspects include providing at least two functions to support data encryption in a database system. The at least two functions are utilized within structured query language statements to preserve confidentiality of user-specified data in the database system.

Through the aspects of the present invention, users have better assurance that data private to a database application remains inaccessible to others, such as database administrators. Further, the provision of the encryption functionality of the present invention in an integrated manner with SQL creates a substantially unlimited range of database environments within which the present invention may be used. These and other advantages of the aspects of the present invention will be more fully understood in conjunction with the following detailed description and accompanying drawings.

DETAILED DESCRIPTION OF THE INVENTION

The present invention relates to protection of confidential data within a database by a user. The following description is presented to enable one of ordinary skill in the art to make and use the invention and is provided in the context of a patent application and its requirements. Thus, the present invention is not intended to be limited to the embodiment shown, but is to be accorded the widest scope consistent with the principles and features is described herein.

Figure 1:
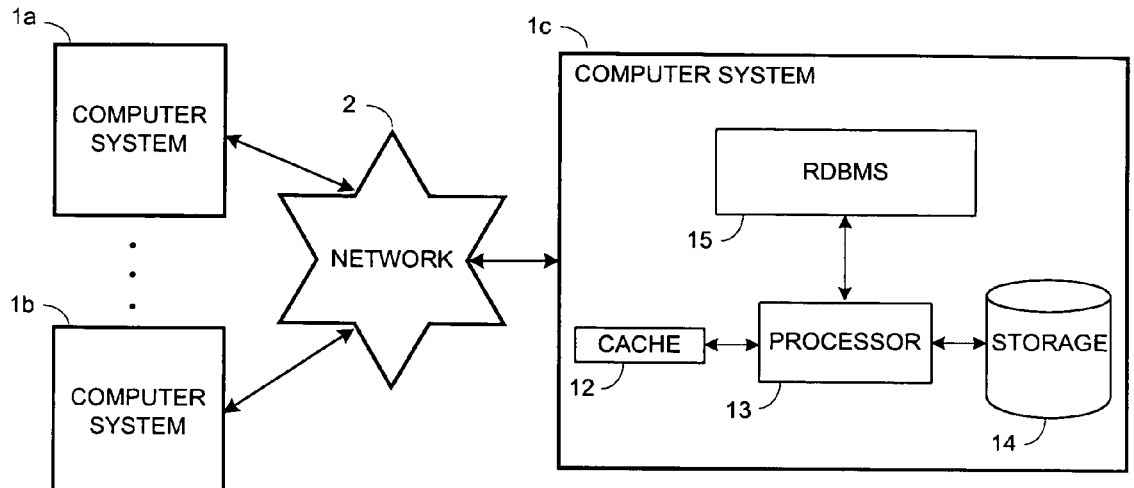
FIG. 1 illustrates an overall block diagram of a computer system network in accordance with the present invention.

As shown in FIG. 1, a plurality of computer systems 1a, 1b, 1c are interconnected via a network 2 (which could be the public Internet or a private intra-corporate Intranet or wide area network). It should be appreciated that although FIG. 1 illustrates a network of computer systems, this is meant as exemplary and not restrictive of the type of environment suitable for the aspects of the present invention. Thus, the aspects may also be provided within a single computing system environment. Accordingly, one (1c) of the computer systems is shown expanded for further illustration.

Computer system 1c has a processor 13 for controlling the overall operation of the computer system 1c, a high speed cache memory 12, a long-term storage device 14 (e.g., hard disk drive), and a database management system 15, e.g., an RDBMS system, such as DB2.

In accordance with the present invention, functions are provided that achieve privacy and user control of access to data in the database system 15, so that only users with the proper access and password can view the data. These functions are integrated into the database system 15 to allow access via SQL statements executed in the database system 15. The integration of the functionality into the database system 15 with the present invention occurs through a straightforward approach that can be utilized as desired with any client application of the database, as described in more detail hereinbelow.

Figure 2:
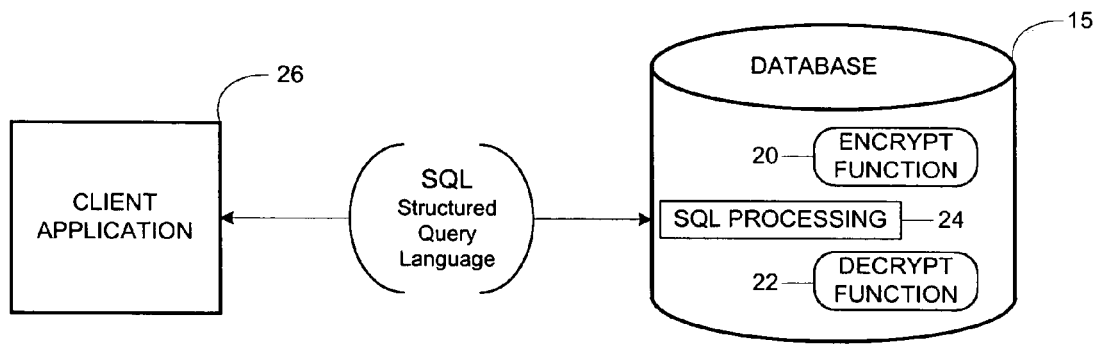
FIG. 2 illustrates a diagram representation of a database system environment in accordance with the present invention.
Figure 3:
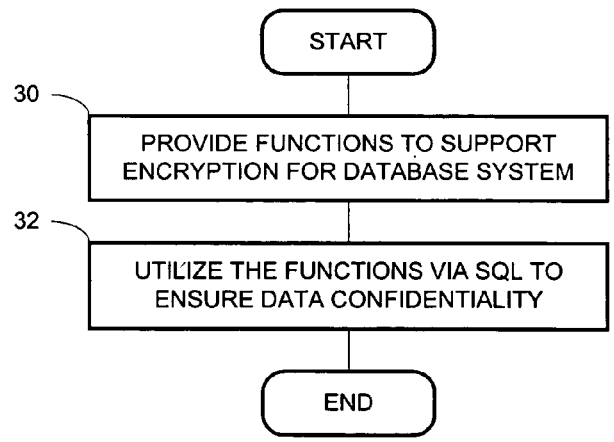
FIG. 3 illustrates a block flow diagram for achieving the protection of confidential data in accordance with the present invention.

Referring to the diagrams of FIG. 2 and FIG. 3, functions, including encrypt function 20 and decrypt function 22, achieve the protection of confidential data in the database system 15. The functions 20 and 22 are suitably provided as user-defined functions in the database system 15 (step 30). A user-defined function (UDF) generally refers to a function that is defined to the database management system and can be referenced thereafter in SQL queries. Alternatively, the functions 20 and 22 may be defined through standard techniques as built-in functions within a database system. The functions 20 and 22 can then be utilized via SQL to ensure data confidentiality in the database system 15 (step 32), i.e., the encrypt function 20 is processed by SQL processing 24 to generate the encrypted form of data as the data is inserted or updated from a client application 26 in the database system 15, while SQL processing 24 of the decrypt function 22 generates the decrypted form of the data during selects from the database system 15 by the client application 24. Thus, each item of data can be uniquely encrypted. Alternatively, a single key/password can be used to encrypt an entire column of data in the database system 15.

By way of example, suppose a table exists for social security numbers (SSN) of employees (EMP) of a company in the database system 15. The following example SQL statements illustrate the use of the encrypt and decrypt functions and encryption password in accordance with the present invention to ensure confidentiality with such a table.
INSERT INTO EMP (SSN) VALUES ENCRYPT ('289-46-8832', 'GEORGE');
SELECT DECRYPT (SSN, 'GEORGE') FROM EMP;

In this example, the SELECT statement returns the value "289-46-8832."

In a further embodiment, the encrypt function 20 may encrypt a password hint, as well. A password hint refers to a phrase that assists data owners in remembering their passwords. With the ability to encapsulate password hints, another function, GETHINT, can be defined that returns an encapsulated password hint.

When the inclusion of a hint for the password is desired, such as the use of the hint "WASHINGTON" for remembering the password of "GEORGE", the insert statement for the example becomes:
INSERT INTO EMP (SSN) VALUES ENCRYPT ('289-46-8832', 'GEORGE', 'WASHINGTON');

A select statement to get the hint:
SELECT GETHINT (SSN) FROM EMP;
returns the value "WASHINGTON."

As demonstrated by the example, the encrypt function 20 and decrypt function 22 preferably follow the basic formats:

ENCRYPT (data-string-expression, password-string-expression) returns varchar
DECRYPT (data-string-expression, password-string-expression) returns varchar or
ENCRYPT (data-string-expression (clob), password-string-expression) returns clob
DECRYPT (data-string-expression (clob), password-string-expression) returns clob.

The format for the encrypt function 20 with a password hint preferably follows the format:
ENCRYPT (data-string-expression, password-string expression, hint-string expression) returns varchar or
ENCRYPT (data-string-expression (clob), password-string expression, hint-string-expression) returns clob And, for the GETHINT function:
GETHINT (data-string-expression) returns varchar or
GETHINT (data-string-expression (clob)) returns varchar In the foregoing formats, varchar suitably refers to variable-length character data with a length of 'n' characters, and clob refers to character large object, i.e., a sequence of characters (single-byte, multi-byte, or both) where the length can be up to 2 gigabytes that can be used to store large text objects, as is well understood in the art. In an exemplary embodiment, the password valid length is 6 to 128 and the hint valid length is 0 to 32. The provision of the password may be done explicitly, or in alternate embodiment, for systems utilizing a login context that requires a user to enter password, the password entered could be utilized as an implicit provision of the encryption key password for the encrypt functions.

With the encryption techniques using a password as an encryption key, the present invention provides a straightforward and flexible technique to protect confidential data in a database in a manner that allows integration with well-established, non-proprietary SQL techniques. Accordingly, users have better assurance that data private to a database application remains inaccessible to others, such as database administrators. Further, the provision of the encryption functionality of the present invention in an integrated manner with SQL creates a substantially unlimited range of database environments within which the present invention may be used.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for integrating encryption functionality into a database system, the method comprising:
    (a) providing at least two functions to support data encryption in a database system; and
    (b) invoking the at least two functions within structured query language statements.

2. The method of claim 1, wherein step (a) further comprises (a1) adding the at least two functions as user-defined functions in the database system.

3. The method of claim 2, wherein the user-defined functions further comprise a first function to encrypt user-specified data when inserted or updated in the database system.

4. The method of claim 3, wherein the user-defined functions further comprise a second function to decrypt the user-specified data when selected from the database system.

5. The method of claim 3, wherein the first function further encrypts the user-specified data with a user-specified password.

6. The method of claim 5, wherein the first function further encrypts with a password hint.

7. The method of claim 6, wherein the user-defined functions further comprise a third function to get the password hint.

8. A system for integrating encryption functionality into a database system, the system comprising:
   at least one computer processing device; and
   a database management system installed on the at least one computer processing device, the database management system supporting utilization of at least two functions for data encryption,
   wherein the at least two functions for data encryption are invoked within structured query language statements.

9. The system of claim 8, wherein the at least two functions further comprise user-defined functions in the database management system.

10. The system of claim 9, wherein the user-defined functions further comprise a first function to encrypt user-specified data when inserted or updated in the database management system.

11. The method of claim 10, wherein the user-defined functions further comprise a second function to decrypt the user-specified data when selected from the database management system.

12. The system of claim 10, wherein the first function further encrypts the user-specified data with a user-specified password.

13. The system of claim 12, wherein the first function further encrypts with a password hint.

14. The system of claim 13, wherein the user-defined functions further comprise a third function to get the password hint.

15. A computer readable medium containing program instructions for integrating encryption functionality into a database system, the program instructions comprising:
   (a) providing at least two functions to support data encryption in a database system; and
   (b) invoking the at least two functions within structured query language statements.

16. The computer readable medium of claim 15, wherein step (a) further comprises (a1) adding the at least two functions as user-defined functions in the database system.

17. The computer readable medium of claim 16, wherein the user-defined functions further comprise a first function to encrypt user-specified data when inserted or updated in the database system, and a second function to decrypt the user-specified data when selected from the database system.

18. The computer readable medium of claim 17, wherein the first function further encrypts the user-specified data with a user-specified password.

19. The computer readable medium of claim 18, wherein the first function further encrypts with a password hint.

20. The computer readable medium of claim 19, wherein the user-defined functions further comprise a third function to get the password hint.

21. A method for integrating encryption functionality into a database system, the method comprising:
   defining a function to support encryption of data in a database system, the encryption of data being based on a user-specified password, the function having a function name; and
   invoking the function within a structured query language statement to control access to the data in the database system including encrypting the data within the database system with the user-specified password,
      wherein the structured query language statement includes the function name and the user-specified password.

22. The method of claim 21, wherein the function is a user-defined function or a built-in function within the database system.

23. The method of claim 21, wherein defining a function to support encryption comprises:
   defining an encrypt function to encrypt data when inserted or updated in the database system; and
   defining a decrypt function to decrypt data when selected from the database system.

24. The method of claim 23, wherein:
   the encrypt function further encrypts a password hint that assists a user in remembering the user-specified password; and
   the method further includes defining a third function to get the password hint.

25. A computer readable medium containing program instructions for integrating encryption functionality into a database system, the program instructions comprising:
   defining a function to support encryption of data in a database system, the encryption of data being based on a user-specified password, the function having a function name; and
   invoking the function within a structured query language statement to control access to the data in the database system including encrypting the data within the database system with the user-specified password,
      wherein the structured query language statement includes the function name and the user-specified password.

26. The computer readable medium of claim 25, wherein the function is a user-defined function or a built-in function within the database system.

27. The computer readable medium of claim 25, wherein defining a function to support encryption comprises:
   defining an encrypt function to encrypt data when inserted or updated in the database system; and
   defining a decrypt function to decrypt data when selected from the database system.

28. The computer readable medium of claim 27, wherein:
   the encrypt function further encrypts a password hint that assists a user in remembering the user-specified password; and
   the method further includes defining a third function to get the password hint.

* * * * *